US010507738B1

(12) United States Patent
Hariri et al.

(10) Patent No.: US 10,507,738 B1
(45) Date of Patent: Dec. 17, 2019

(54) SYSTEMS AND METHODS FOR ELECTRIC VEHICLE CHARGING DECISION SUPPORT SYSTEM

(71) Applicants: Abla Hariri, Miami, FL (US);
Mohamad El Hariri, Miami, FL (US);
Tarek Youssef, Miami, FL (US);
Osama Mohammed, Miami, FL (US)

(72) Inventors: Abla Hariri, Miami, FL (US);
Mohamad El Hariri, Miami, FL (US);
Tarek Youssef, Miami, FL (US);
Osama Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/256,249

(22) Filed: Jan. 24, 2019

(51) Int. Cl.
*B60L 53/64* (2019.01)
*B60L 53/66* (2019.01)
*B60L 53/30* (2019.01)
*G06Q 50/06* (2012.01)

(52) U.S. Cl.
CPC ............ *B60L 53/64* (2019.02); *B60L 53/305* (2019.02); *B60L 53/665* (2019.02); *G06Q 50/06* (2013.01)

(58) Field of Classification Search
CPC ...... B60L 53/64; B60L 53/305; B60L 53/665; G06Q 50/06; G06Q 30/02
USPC .......................................................... 320/109
See application file for complete search history.

(56) References Cited

U.S. PATENT DOCUMENTS

| 8,981,715 | B2* | 3/2015 | Ichikawa | G07C 5/085 |
| | | | | 320/109 |
| 8,981,717 | B2* | 3/2015 | Hayashi | B60L 3/12 |
| | | | | 320/109 |
| 2010/0241299 | A1* | 9/2010 | Ito | B60L 53/18 |
| | | | | 701/22 |
| 2011/0224852 | A1* | 9/2011 | Profitt-Brown | B60L 53/64 |
| | | | | 701/22 |
| 2014/0012448 | A1* | 1/2014 | Tripathi | G05D 1/0276 |
| | | | | 701/22 |
| 2018/0189683 | A1* | 7/2018 | Newman | G06Q 10/02 |

* cited by examiner

*Primary Examiner* — M Baye Diao
(74) *Attorney, Agent, or Firm* — Saliwanchik, Lloyd & Eisenschenk (57) ABSTRACT

Methods and systems for an electric vehicle charging decision support system are provided. A system can include: a higher level agent configured to be connected to an energy grid and to receive a charging request from an electric vehicle and transmit the charging request to a virtual block agent; and a plurality of charging station agents connected to an energy service provider, the energy grid, and the virtual block agent. The virtual block agent can be configured to receive a respective power set-point and availability from the plurality of charging station agents and transmit a recommended energy price charged at a respective charging station to the energy service provider. The recommended price can maximize a probability of an electric vehicle agent choosing a particular charging station. The system facilitates a win-win situation for the mutual and simultaneous benefit of electric vehicles and the power grid.

20 Claims, 5 Drawing Sheets

| EV #, SoC | EV GPS coord. | CS # | GPS coord. | dCS | tCS | pCS | FLM result |
|---|---|---|---|---|---|---|---|
| 1, 70% | 25.73589, -80.38164 | 1 | 25.73411, -80.37817 | 0.6 | 5 | 13 | 0.858 |
|  |  | 2 | 25.74591, -80.36935 | 1.6 | 5 | 13 | 0.833 |
|  |  | 3 | 25.73931, -80.37799 | 0.5 | 3 | 13 | 0.858 |
| 2, 85% | 25.7544, -80.36986 | 1 | 25.75488, -80.37193 | 0.1 | 1 | 19 | 0.25 |
|  |  | 2 | 25.75844, -80.37957 | 1.1 | 6 | 10 | 0.994 |
| 3, 20% | 25.75429, -80.36448 | 1 | 25.7546, -80.36536 | 0.2 | 1 | 19 | 1 |
|  |  | 2 | 25.75641, -80.35446 | 1.1 | 4 | 14 | 0.65 |
|  |  | 3 | 25.74754, -80.35269 | 1.2 | 4 | 14 | 0.636 |
| 4, 55% | 25.74233, -80.36419 | 1 | 25.73346, -80.35442 | 1.3 | 6 | 19 | 0.467 |
|  |  | 2 | 25.73264, -80.36689 | 1 | 5 | 15 | 0.75 |
|  |  | 3 | 25.74277, -80.36008 | 0.4 | 1 | 13 | 0.858 |

SYSTEMS AND METHODS FOR ELECTRIC VEHICLE CHARGING DECISION SUPPORT SYSTEM

BACKGROUND

Electric vehicle (EV) ownership is expected to continue to rise, due to legislative polices, economic considerations, and changing social demographics. However, the uncontrolled connection of a large fleet of electric vehicles to a power grid will cause large amounts of stress on the power system infrastructure and thus increased losses for utilities and energy service providers.

BRIEF SUMMARY

Embodiments of the subject invention provide decision-support systems for the management of connected electric vehicles in a public charging application. The system can be described as a hierarchal multi-agent system. The top down hierarchy can include a higher level agent (HLA), multiple virtual block agents (VBAs), charging station agents (CSAs), and electric vehicle agents (EVAs). The VBA is an agent that interfaces with the energy management system of the local utilities company or energy service provider. This VBA will serve as a decision-making module to support and facilitate a decision for manipulating the charging price variable at the different charging stations in a way that leads to the redistribution of the requesting electric vehicles onto charging stations, which in turn leads to balancing the load among the charging stations, thus alleviating stresses and minimizing losses.

In an embodiment, an electric vehicle charging decision support system can comprise: a higher level agent, configured to be connected to an energy grid and receive a charging request from an electric vehicle and transmit the charging request to a virtual block agent; the virtual block agent, configured to receive a respective power set-point and availability from a plurality of charging station agents and transmit a recommended energy price charged at a respective charging station to an energy service provider and to the plurality of charging station agents; and the plurality of charging station agents, configured to be connected to the energy service provider, the energy grid, and the virtual block agent. The recommended energy price can maximize a probability of an electric vehicle agent choosing a particular charging station. In a further embodiment, the electric vehicle can comprise an electric vehicle agent configured to be in operable communication with the virtual block agent, the electric vehicle agent can be configured to recommend the particular charging station, and the recommendation can be based upon a state of charge of a battery of the electric vehicle, a driving distance to the particular charging station, a driving time to reach the particular charging station, and the price at the particular charging station. All four parameters can be obtained in real-time.

In another embodiment, a method for supporting an electric vehicle charging decision can comprise: transmitting, by a higher level agent connected to an energy grid, a charging request from an electric vehicle to a virtual block agent; receiving, by the virtual block agent, a respective power set-point and availability from a plurality of charging station agents (the plurality of charging station agents being connected to an energy service provider, the energy grid, and the virtual block agent); and transmitting, by the virtual block agent, a recommended energy price charged at a respective charging station to the energy service provider. The recommended price can maximize a probability of an electric vehicle agent choosing a particular charging station.

DETAILED DESCRIPTION

The following disclosure and exemplary embodiments are presented to enable one of ordinary skill in the art to make and use systems and methods for a decentralized hierarchical multi-agent electric vehicle charging decision support system for electric vehicle according to the subject invention. Various modifications to the embodiments will be readily apparent to those skilled in the art and the generic principles herein may be applied to other embodiments. Thus, the systems and methods related to the electric vehicle charging decision support system are not intended to be limited to the embodiments shown, but are to be accorded the widest scope consistent with the principles and features described herein.

Embodiments of the subject invention provide decision-support systems for the management of connected electric vehicles in a public charging application. The system can be described as a hierarchal multi-agent system. The top down hierarchy can include a higher level agent (HLA), multiple virtual block agents (VBAs), charging station agents (CSAs), and electric vehicle agents (EVAs). The VBA is an agent that interfaces with the energy management system of the local utilities company or energy service provider. This VBA will serve as a decision-making module to support and facilitate a decision for manipulating the charging price variable at the different charging stations in a way that leads to the redistribution of the requesting electric vehicles onto charging stations, which, to the benefit of the power system, will turn lead to balancing the load among the charging stations, thus alleviating stresses on the power grid and minimizing power losses.

Embodiments of the subject invention provide decentralized hierarchical multi-agent systems (MASs), in which each electric vehicle and electric vehicle charging station (CS) is equipped with an intelligent agent. These agents interact with a higher-level agent (HLA) and a virtual block agent (VBA) responsible for managing charging requests within their geographical area. Electric vehicles referred to herein can include plug-in/wirelessly-charged hybrids and full electric vehicles. Electric vehicles can include, for example, automobiles, trucks, scooters, or bicycles.

When an electric vehicle is in need of a charging session at a public charging station, a request is issued by an on-board computing device, or the electric vehicle agent, which is configured with two-way communication capability. Following a communication scheme that involves the other agents, the request is fulfilled and the electric vehicle driver is notified which charging station to go to, and the charging session is reserved for that electric vehicle at the charging station. If the electric vehicle is an autonomous vehicle, the navigation module would reroute to head to the identified charging station. This electric vehicle agent acts as an intelligent decision-support module to facilitate the electric vehicle's decision by processing a set of charging station and electric vehicle-related data to decide on the charging station to head to. Among those inputs are the electric vehicle battery's state of charge, traffic, and the price of charging at the charging stations. The traffic element is considered as two inputs: the distance and time needed for the vehicle to reach the charging station, given the traffic conditions at the time when the request was issued. This presents a needed user-convenience solution. After requesting a charging session, the EV agent will assess all available alternatives of charging stations and chooses the optimal decision for the electric vehicle's welfare as well as the driver's time and other preferences.

The VBA is equipped with a two-way communication capability, allowing it to coordinate with the HLA and the charging station agents. The VBA can continuously receive the charging requests coming from EV agents from the geographical area that it manages, the status of the charging stations in that same area, apply its price-based strategy, and issue the new price recommendations that lead to an anticipated distribution of the electric vehicles onto the charging stations. The VBA strategy's objective is to meet the power set points obtained from an energy management algorithm or an optimization algorithm that takes the loading and distributed generation at each charging station into consideration.

Figure 1:
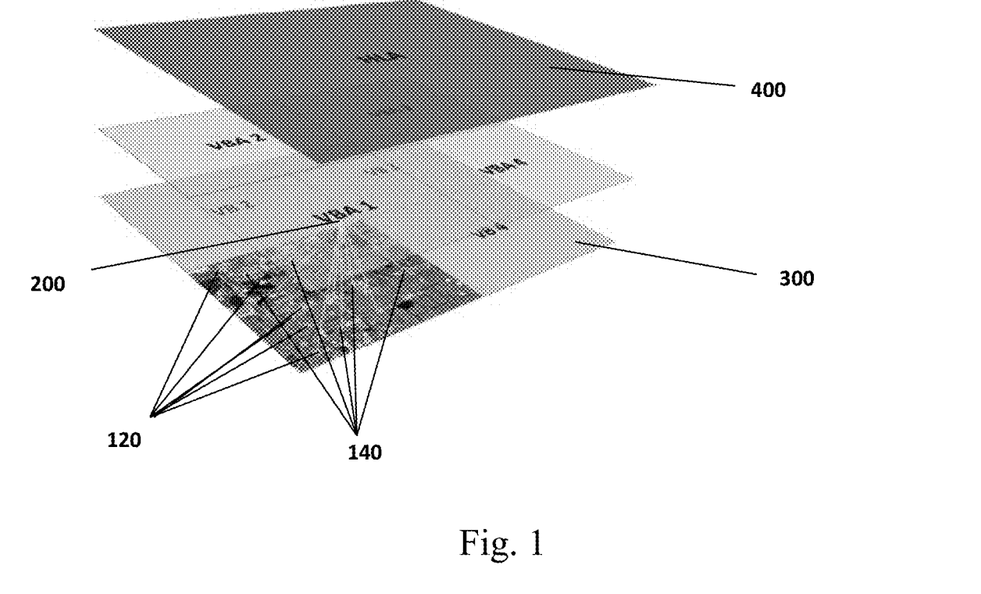
FIG. 1 is a diagram illustrating a multi-agent system (MAS).

FIG. 1 shows a conceptual figure of an MAS System. The MAS involves an EV agent 120, a charging station (CS) agent 140, a virtual block agent (VBA) 200 for each virtual block (VB) 300, and a higher-level agent (HLA) 400, reaching out to several VBAs 200.

Figure 2:
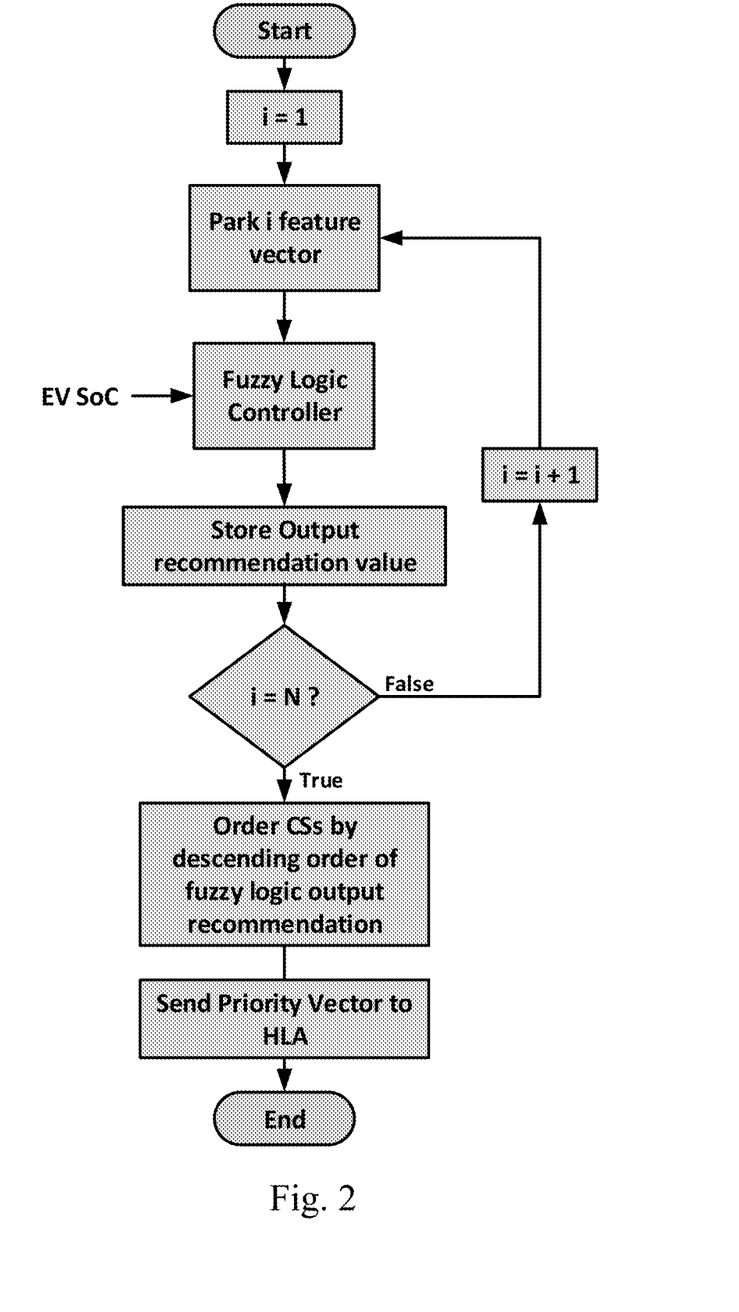
FIG. 2 is a block diagram describing the sequence of events taken in an electric vehicle agent.
Figure 7:
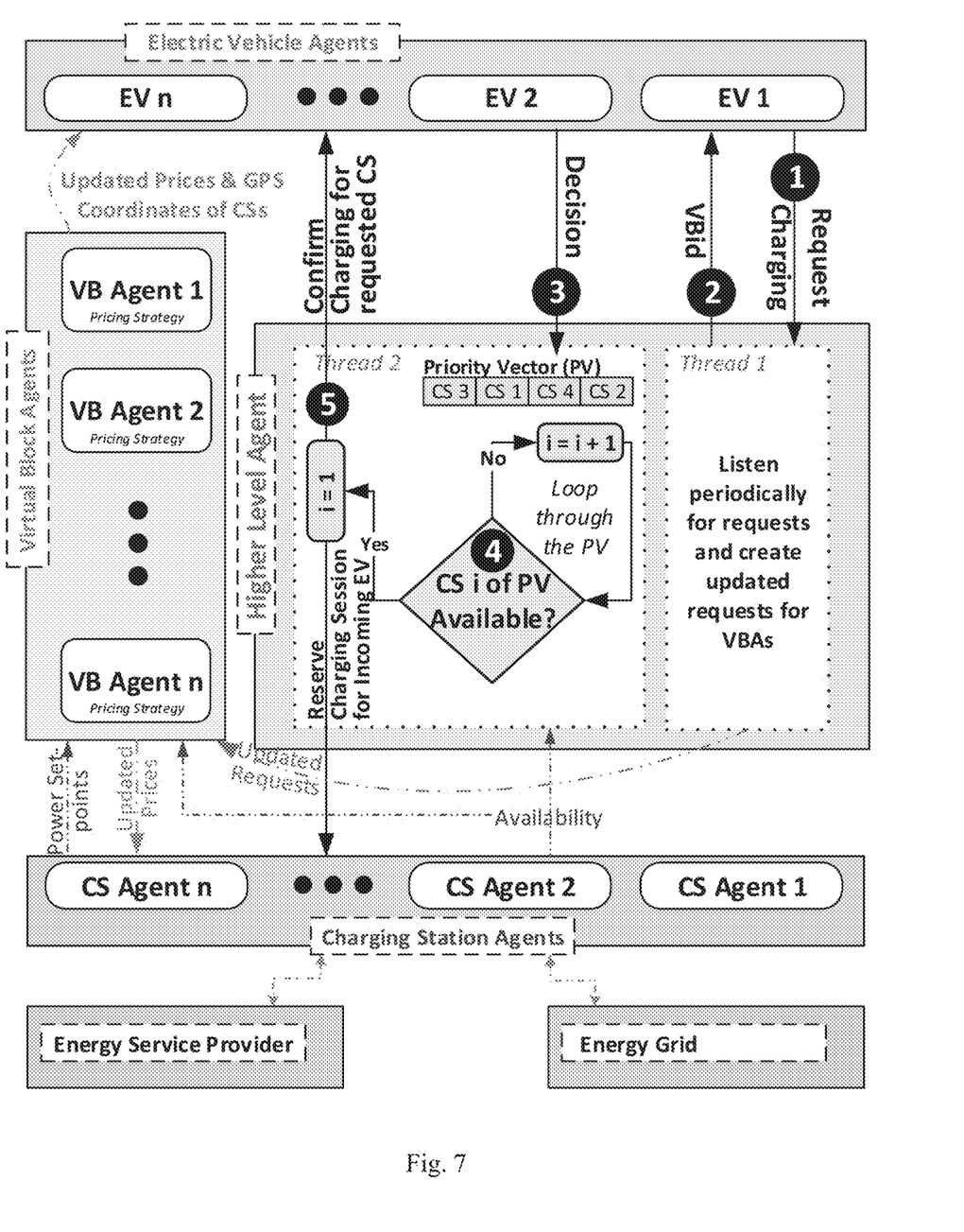
FIG. 7 shows a diagram of the flow of information and logical relation between agents according to an embodiment of the subject invention.

FIG. 7 shows a diagram of the flow of information and logical relation between agents according to an embodiment of the subject invention. Referring to FIG. 7, an electric vehicle driver can submit a charging request signal using the electric vehicles' agents (step 1). The HLA continuously collects these requests (Thread 1 in the higher level agent in FIG. 7) and sends them to the VBA responsible for the corresponding geographical block, or virtual block. The VBA continuously receives two parameters from each charging station agent: its pre-defined power set-point, which could be obtained either from an internal energy management system (EMS) or from a power system optimization; and its availability in terms of number of chargers and/or stalls. Each VBA then issues a price vector that maximizes its chance of success at distributing the electric vehicles on the different charging stations in a way that meets the anticipated load distribution in the charging stations. The electric vehicle agents that had requested a charging session then receive this vector, by communicating with the VBA managing its area, using the VB ID sent to it by the HLA (step 2). Each electric vehicle agent comprises a fuzzy-logic controller (FLC). This FLC is designed to take a "feature vector" made up of four inputs. The first is the state of charge (SoC) of the electric vehicle's battery; the second and third are respectively the distance and the time the electric vehicle must drive to reach a particular charging station (CSx); and the fourth is the price of charging at CSx. Since this feature vector is different for each considered charging station, the FLC has to undergo an evaluation for each feature vector independently. The evaluation is made using a predefined set of fuzzy logic rules, with the combination of four inputs. Therefore, for each CSx, it will result in a value on how likely it recommends that the electric vehicle goes to this particular CSx. It then sorts the recommendations, and issues a priority vector (PV) of the CSs that can meet, in descending order, a compromise between minimizing the price, distance and time to travel to it, while considering the electric vehicle's SoC (step 3). This process of the on-board fuzzy logic-based module is depicted in FIG. 2. The HLA assesses the PVs against the Availabilities at the different CSs (step 4 in FIG. 7) and confirms the one available to the EV agent (step 5 in FIG. 7). The HLA simultaneously reserves the charging sessions for incoming EVs at the CSs.

Deploying this decision-support system will provide an automated solution for the energy service providers, in coordination with the electric vehicle service providers (EVSPs), to redistribute the requesting electric vehicles onto charging stations in a way that meets the power set points, thus alleviating stresses and minimizing losses.

In addition, with access to the information collected while the electric vehicles are still en route (pre-connection to the grid), the EVSPs will be able to enhance the dispatch of the charging stations' energy resources, whether from generators, renewable energy resources, or energy storage systems, and thus serving the overall purpose of serving the incoming vehicles requesting charge. As for the provided benefit to the overall operation of the grid, the extra awareness and visualization of the system operator ultimately helps in achieving better control at both secondary and tertiary levels.

The systems and methods of embodiments of the subject invention are designed to meet the real-time operational requirement of this framework. The effectiveness of this multi-agent framework is demonstrated in case studies, where electric vehicles are routed to the most suitable charging stations in their vicinity in a manner that satisfies the charging preferences of customers, with the lowest cost possible, while ensuring that the generation-load balance at the charging stations is not violated.

Electric vehicles can be retrofitted with processor-boards having the intelligent modules embedded. The charging station agents can be interfaced with the energy management units (EMUs) at the charging stations. In addition, the Energy Service Provider (ESP) may choose to have the VBA running on one of their servers to interface with their energy management system. The HLA can be run on any server, and can be a cloud-based agent.

This framework provides the capability to collect data for visualization of energy consumption and demand in order to manage the distribution of the electric vehicles onto the charging stations as a precautionary step to mitigate foreseen violations of power system operating limits by meeting technical control objectives. Furthermore, the deployment of this framework on any scale will lead to promoting electric vehicle ownership in the long run.

The methods and processes described herein can be embodied as code and/or data. For example, each "agent" described herein can be software code, algorithm, and/or a set of instructions that can be executed by a processor. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 3:
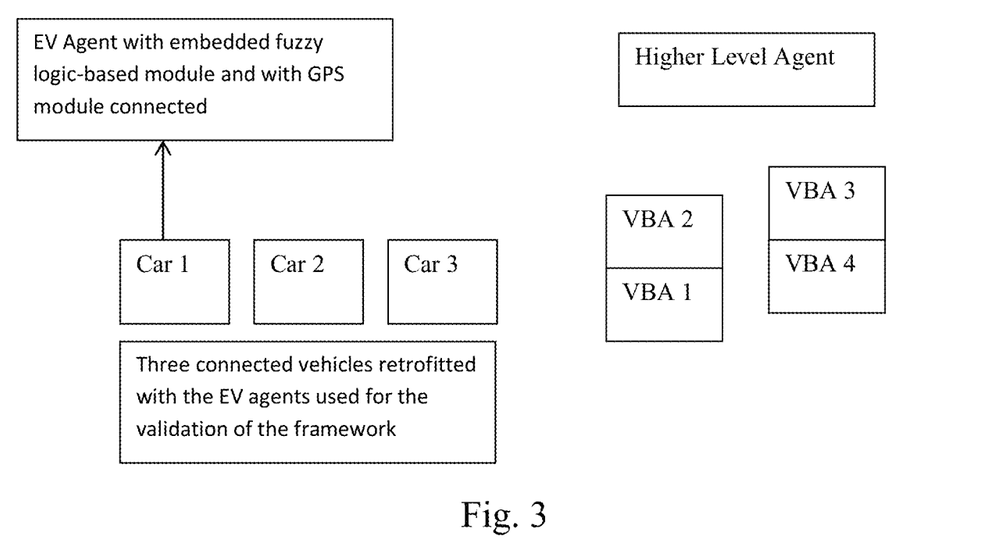
FIG. 3 shows images of a high level agent (HLA), virtual block agents (VBAs), and an electric vehicle agent (EVA).

Three cars, as can be seen in FIG. 3, were retrofitted with the software agents embedded on processor boards that are connected in each respective car. The cars used were equipped with a data plan. The on-board module was configured to connect to this data plan, giving it access to the internet. The agents then communicated, over the internet, with the agents residing in the smart grid testbed at Florida International University. Concurrently, the cars were driven around four virtual blocks in the City of Sweetwater, Miami, Fla., USA. The system including the software agents successfully route the cars to charging stations with an advantageous set of circumstances based on price, distance, time, and the battery's charge state from the EV ide, and reduced power losses and transmission line congestion from the power grid side. This would lead to the mutual benefit of both the EV and the power grid.

The effectiveness of the proposed bilateral decision support framework was demonstrated by presenting price-based case studies from two complementary perspectives: A) the on-board decision support module to choose the optimal CS in favor of the EVs' status; and B) the electric power grid decision support by means of the VBA pricing strategy to redistribute load demands onto the CSs.

Figure 4:
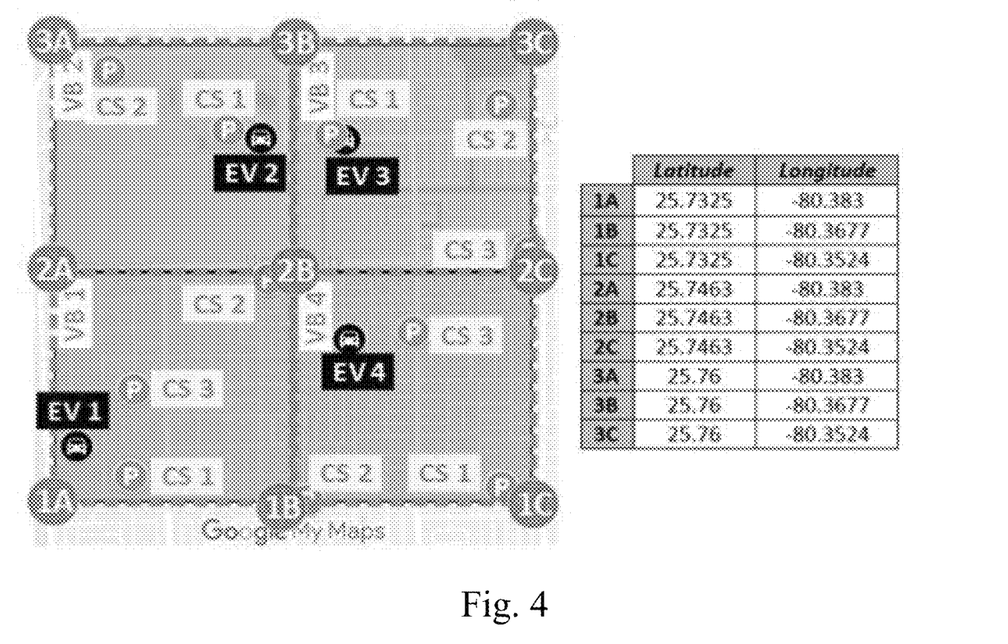
FIG. 4 shows a diagram of virtual blocks (VBs), charging stations (CSs), and electric vehicles (EVs).

A) To corroborate the robustness of the on-board module's response to different scenarios, 4 VBs were defined, as shown in FIG. 4. Four EV requests for charging were issued, each from a different VB. Two or three CSs were defined in each VB. The locations of those CSs were selected to be in public parking garages, shopping plazas, and university campus garages. FIG. 4 marks the 4 EVs, the 11 CSs, and the 4 VBs on the map. Also, the GPS coordinates of the VB boundaries were identified. The EVs' locations marked on the map represent the location at which they issued the request for charging from. The connected cars, retrofitted with the on-board module (EV Agent), roamed around the 4 VBs.

Figure 6:
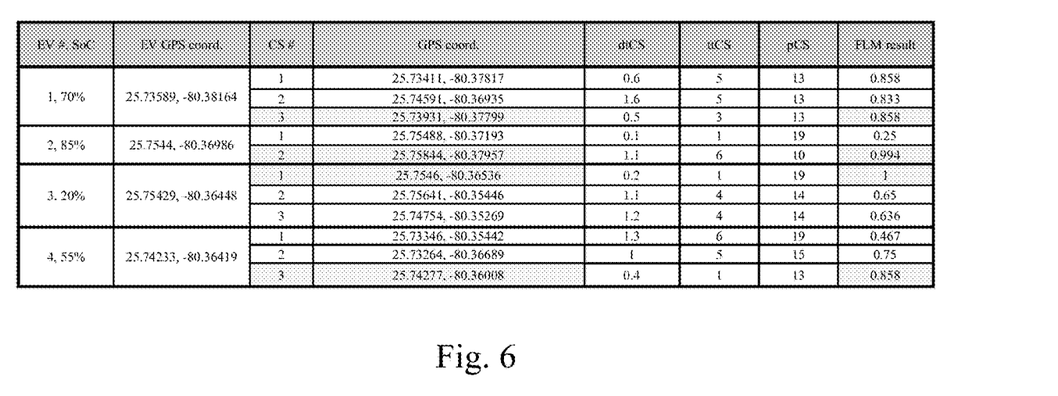
FIG. 6 shows a table of inputs and outputs of a fuzzy logic module (FLM).

The table in FIG. 6 shows the input parameters for the on-board module in the four case studies, the calculated driving distance to the CS (dtCS) and driving time to reach the CS (ttCS), and the output results of the EV Agent. The recommendations given by the EV Agent to the driver are the CSs highlighted in Table 1 (CS #3 for EV#1, CS #2 for EV#2, CS#1 for EV#3, and CS#3 for EV#4).

Case 1 (VB1): The prices at all the 3 CSs in VB1 were set at the Florida state price of supercharging at the time when this example was applied; that is, all CSs had a charging price of 0.13 $/kWh. Also, the EV Agent perceived a high SoC (70%). Therefore, the only two parameters governing the decision of the EV Agent were the dtCS and ttCS. Thus, the EV Agent will decide to go to the closest in terms of time and distance, i.e. CS3.

Case 2 (VB2): In this case, the price of charging at CS1 is 0.19 $/kWh, representing a high price rate, whereas at CS2 the price of charging is 0.10 $/kWh, representing a low charging rate. Also, the EV Agent perceives a high SoC (85%). Despite the fact that CS1 is closer to EV2 than CS2 is, in terms of distance and time, the EV Agent recommended going to CS2, which is the CS with the lower price. It is important to mention here that this is viable since it is assumed the 6 min ttCS2 is within the driver's preset time preference.

Case 3 (VB3): The price at CS1 is set at 0.19 $/kWh, which is higher than that of CS2 and CS3 (0.14 $/kWh each). The SoC of EV3 is 20%. Although the prices at CSs 2 and 3 are lower than that at CS1, the EV Agent recommends going to CS1, the closest CS in terms of distance and time because it senses that the SoC is critical, being 20%.

Case 4 (VB4): In this case, the prices at the 3 CSs are set to be at three levels: low (0.13 $/kWh), medium (0.15 $/kWh), and high (0.19 $/kWh). The SoC of EV4 is 55%. Therefore, the EV Agent recommends going to CS3, the one with lowest price and the closest in terms of distance and time.

The results of these four case studies demonstrate that the decision-support task of the on-board module (EV Agent) works as anticipated, in favor of the EV status.

B) To evaluate the validity of the VBA strategy in supporting the power system by meeting the set points provided to it, a case study was applied, where 21 EVs and 6 CSs were located in one VB. The VBA applied its strategy by varying the price of charging in each CS within its VB, evaluating the distribution of the EVs in response to each price combination, and deciding on the optimal price combination that if issued, will lead to the anticipated distribution of the EVs onto the CSs to meet the power set points.

Figure 5:
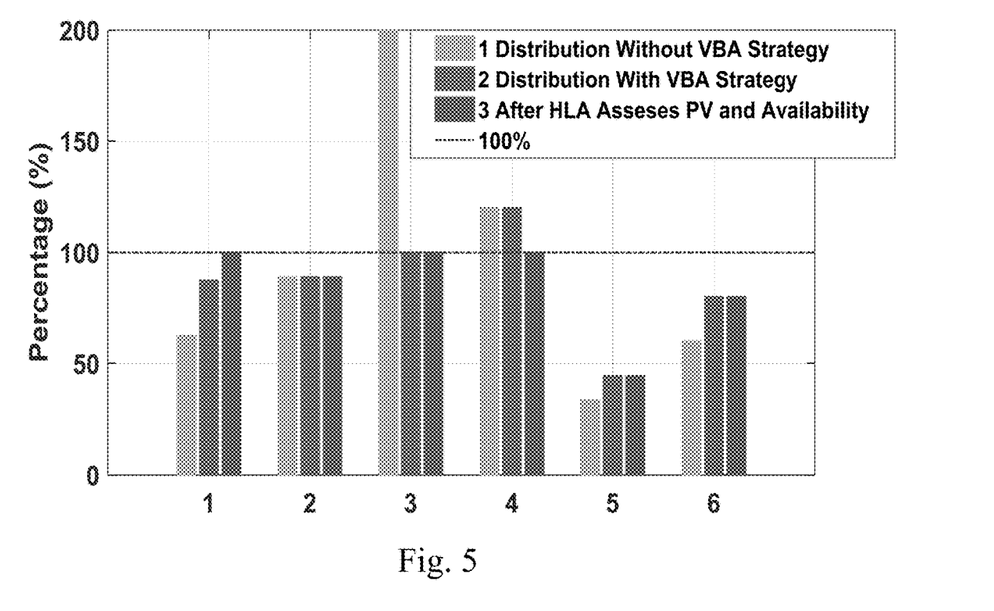
FIG. 5 shows a bar chart of percentage of power consumption for power set points at charging stations. Referring to the legend, the top section ("distribution without VBA strategy") is the left-most bar in each of the six groupings, the second section ("distribution with VBA strategy") is the middle bar in each of the six groupings, and the third section ("after HLA assesses PV and availability") is the right-most bar in each of the six groupings. The bottom section of the legend (the dotted line for 100%) can be seen at the 100% line in the bar chart.

FIG. 5 shows the percentage of power consumption to the anticipated power set points at all CSs, before and after applying the VBA strategy. The left-most bars and middle bars in each grouping represent the CS's percentages resulting from the distribution of the EVs before and after applying the VBA strategy, respectively. This improvement in the percentages reflects the success of the redistribution of the EVs by the VBA's strategy. However, in CS4, the percentage remains at 120%, and was not reduced to 100%. In this case, one of the EVs that will most probably recommend CS4 to the driver will not be accommodated. Thus, when the HLA assesses the availability at that CS, it finds out that this EV cannot be accommodated. Because each EV communicates a feedback to the HLA, including a priority vector (PV), it is now the HLA's role to find the next available CS based on the EV Agent's PV. In this example, the HLA assesses the subsequent CS priority in the PV issued by that EV. The HLA continues and loops through the PV until it finds a CS that can accommodate this EV. In this case, the second CS in this EV's PV is CS1. The HLA finds that CS1 can accommodate this EV. The new distribution is evaluated, and the right-most bars in each grouping in FIG. 5 reflect the results. The results show further improvement in the percentages for CS4 and CS1. The anticipated power set points were not exceeded at any CS (i.e., all remained within the 100% of power consumption to the anticipated power set points).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An electric vehicle charging decision support system, comprising:
   a higher level agent, configured to be connected to an energy grid and receive a charging request from an electric vehicle and transmit the charging request to a virtual block agent;
   the virtual block agent, configured to receive a respective power set-point and availability from a plurality of charging station agents and transmit a recommended energy price charged at a respective charging station to an energy service provider and the plurality of charging station agents; and
   the plurality of charging station agents, configured to be connected to the energy service provider, the energy grid, and the virtual block agent,
   the recommended energy price maximizing a probability of an electric vehicle agent choosing a particular charging station.

2. The system of claim 1, the electric vehicle comprising the electric vehicle agent in operable communication with the virtual block agent, the electric vehicle agent being configured to recommend the particular charging station.

3. The system of claim 2, the recommendation of the particular charging station being based upon a state of charge of a battery of the electric vehicle, a driving distance to the particular charging station, a driving time reach to the particular charging station, and the price at the particular charging station.

4. The system of claim 3, the electric vehicle agent comprising a fuzzy logic controller configured to compute the recommendation of the particular charging station.

5. The system of claim 1, the energy grid being subdivided into geographical areas, each geographical area managed by at least one respective virtual block agent.

6. The system of claim 5, each respective virtual block agent being connected to a plurality of charging stations.

7. The system of claim 2, further comprising an interface for giving permitting a driver of the electric vehicle guidance to a particular charging station that takes into account welfare of the electric vehicle, a preference of the driver, and welfare of a power grid.

8. The system of claim 7, the higher level agent being further configured to reserve the chosen particular charging station.

9. The system of claim 1, the higher level agent and the virtual block agents being configured to communicate with each other via an internet connection.

10. The system of claim 1, the electric vehicle agent being included in a computing device of an automobile, a truck, a scooter, or a bicycle.

11. A method for supporting an electric vehicle charging decision, the method comprising:
   transmitting, by a higher level agent connected to an energy grid, a charging request from an electric vehicle to a virtual block agent;
   receiving, by the virtual block agent, a respective power set-point and availability from a plurality of charging station agents, the plurality of charging station agents being connected to an energy service provider, the energy grid, and the virtual block agent; and
   transmitting, by the virtual block agent, a recommended energy price charged at a respective charging station to the energy service provider,
   the recommended energy price maximizing a probability of an electric vehicle agent choosing a particular charging station.

12. The method of claim 11, further comprising recommending, by an electric vehicle agent, the particular charging station.

13. The method of claim 12, the recommendation of the particular charging station being based upon a state of charge of a battery of the electric vehicle, a driving distance to the particular charging station, a driving time to reach the particular charging station, and the price at the particular charging station.

14. The method of claim 13, the recommendation of the particular charging station being further based on a driver's preferences.

15. The method of claim 11, further comprising subdividing the energy grid into geographic areas, each geographical area being managed by at least one respective virtual block agent.

16. The method of claim 15, connecting each respective virtual block agent to a plurality of charging stations located in the virtual block agent's respective geographic area.

17. The method of claim 12, further comprising providing an interface for giving a driver of the electric vehicle guidance to a particular charging station that takes into account welfare of the electric vehicle, a preference of the driver, and welfare of a power grid.

18. The method of claim 17, further comprising reserving, by the higher level agent, a charging station based on the driver's choice of the particular charging station.

19. The method of claim 11, the electric vehicle agent being included in a computing device of an automobile, a scooter, or a bicycle.

20. An electric vehicle charging decision support system, comprising:
- a higher level agent, configured to be connected to an energy grid and to receive a charging request from an electric vehicle and transmit the charging request to a virtual block agent; and
- the virtual block agent, configured to receive a respective power set-point and availability from a plurality of charging station agents and transmit a recommended energy price charged at a respective charging station to an energy service provider and the plurality of charging station agents; and
- the plurality of charging station agents, configured to be connected to the energy service provider, the energy grid, and the virtual block agent,
- the recommended energy price maximizing a probability of an electric vehicle agent choosing a particular charging station,
- the electric vehicle comprising an electric vehicle agent configured to be in operable communication with the virtual block agent,
- the electric vehicle agent being configured to recommend the particular charging station, and the recommendation being based upon a state of charge of a battery of the electric vehicle, a driving distance to the particular charging station, a driving time to reach the particular charging station, and the price at the particular charging station.

* * * * *